United States Patent
Gwak et al.

(10) Patent No.: US 11,505,725 B2
(45) Date of Patent: *Nov. 22, 2022

(54) ADHESIVE COMPOSITION INCLUDING ETHYLENE/ALPHA-OLEFIN COPOLYMER

(71) Applicant: LG Chem, Ltd., Seoul (KR)

(72) Inventors: Rae Keun Gwak, Daejeon (KR); Eun Jung Lee, Daejeon (KR); Jin Sam Gong, Daejeon (KR); Jung Ho Jun, Daejeon (KR); Tae Su Kim, Daejeon (KR)

(73) Assignee: LG Chem, Ltd.

( * ) Notice: Subject to any disclaimer, the term of this patent is extended or adjusted under 35 U.S.C. 154(b) by 166 days.

This patent is subject to a terminal disclaimer.

(21) Appl. No.: 16/956,875

(22) PCT Filed: May 3, 2019

(86) PCT No.: PCT/KR2019/005371
§ 371 (c)(1),
(2) Date: Jun. 22, 2020

(87) PCT Pub. No.: WO2019/212310
PCT Pub. Date: Nov. 7, 2019

(65) Prior Publication Data
US 2021/0062050 A1 Mar. 4, 2021

(30) Foreign Application Priority Data

May 4, 2018 (KR) .................. 10-2018-0052043
May 4, 2018 (KR) .................. 10-2018-0052046

(51) Int. Cl.
| | |
|---|---|
| C08F 210/16 | (2006.01) |
| C09J 123/16 | (2006.01) |
| C08F 4/64 | (2006.01) |
| C09J 123/08 | (2006.01) |
| C08F 2/34 | (2006.01) |
| C08F 4/6592 | (2006.01) |
| C09J 11/08 | (2006.01) |

(52) U.S. Cl.
CPC .......... *C09J 123/0815* (2013.01); *C08F 2/34* (2013.01); *C08F 4/6592* (2013.01); *C08F 210/16* (2013.01); *C09J 11/08* (2013.01); *C09J 123/16* (2013.01)

(58) Field of Classification Search
CPC .. C08F 210/16; C08F 4/6592; C08F 2420/02; C09J 123/0815
See application file for complete search history.

(56) References Cited

U.S. PATENT DOCUMENTS

| | | | |
|---|---|---|---|
| 4,935,474 A | 6/1990 | Ewen et al. | |
| 5,739,225 A | 4/1998 | Tazaki et al. | |
| 5,914,289 A | 6/1999 | Razavi | |
| 6,107,430 A | 8/2000 | Dubois et al. | |
| 6,121,402 A | 9/2000 | Machida et al. | |
| 6,183,863 B1 | 2/2001 | Kawachi et al. | |
| 6,828,394 B2 | 12/2004 | Vaughan et al. | |
| 6,841,631 B2 | 1/2005 | Loveday et al. | |
| 6,894,128 B2 | 5/2005 | Loveday et al. | |
| 7,531,601 B2 * | 5/2009 | Karjala | C09J 123/0815 525/240 |
| 7,795,365 B2 * | 9/2010 | Karjala | C10M 107/02 208/18 |
| 7,989,543 B2 * | 8/2011 | Karjala | C08F 10/00 526/348 |
| 8,222,339 B2 * | 7/2012 | Yalvac | C09J 153/00 524/543 |
| 8,329,848 B2 | 12/2012 | Kajihara et al. | |
| 8,901,267 B2 | 12/2014 | Kum et al. | |
| 9,023,945 B2 * | 5/2015 | Mavridis | C08L 23/06 525/240 |
| 9,353,295 B2 | 5/2016 | Kum et al. | |
| 9,822,200 B2 * | 11/2017 | Kim | C07F 7/10 |
| 2002/0147286 A1 | 10/2002 | Resconi et al. | |
| 2006/0198983 A1 | 9/2006 | Patel | |
| 2008/0281037 A1 | 11/2008 | Karjala et al. | |
| 2010/0087609 A1 | 4/2010 | Park et al. | |
| 2010/0160497 A1 | 6/2010 | Karjala et al. | |
| 2011/0003524 A1 | 1/2011 | Claasen et al. | |
| 2012/0196985 A1 | 8/2012 | Lee et al. | |
| 2013/0085246 A1 | 4/2013 | Kum et al. | |
| 2013/0202902 A1 | 8/2013 | DeJesus et al. | |

(Continued)

FOREIGN PATENT DOCUMENTS

| CN | 101291964 A | 10/2008 |
|---|---|---|
| CN | 101679561 A | 3/2010 |

(Continued)

OTHER PUBLICATIONS

International Search Report from Application No. PCT/KR2019/005371 datd Aug. 9, 2019, 3 pages.
Kim et al., "Production of Polyethylene Wax via Metallocene Catalysts [(TMDS)Cp2]ZrCl2 and [(n-Bu)2Cp2]ZrCl2 in the Presence of Hydrogen Gas as a Chain Transfer Reagent", School of Dispaly and Chemical Engineering, Yeungnam University, Polymer (Korea), vol. 32, No. 6, Aug. 2008, pp. 566-572, English Translation of Abstract Included Only.
Examination Report for Indian Application No. 202017013608 dated Dec. 20, 2021, 2 pgs.
Examination Report for Indian Application No. 202017039423 dated Dec. 13, 2021, 2 pgs.

(Continued)

*Primary Examiner* — Rip A Lee
(74) *Attorney, Agent, or Firm* — Lerner, David, Littenberg, Krumholz & Mentlik, LLP

(57) ABSTRACT

The present invention provides an adhesive composition including an ethylene/alpha-olefin copolymer; and a tackifier, wherein the ethylene/alpha-olefin copolymer has narrow molecular weight distribution together with a low density and an ultra low molecular weight, minimized number of unsaturated functional groups, uniform crystallinity, thereby showing excellent physical properties.

20 Claims, No Drawings

(56) References Cited

U.S. PATENT DOCUMENTS

| | | | |
|---|---|---|---|
| 2013/0255756 A1 | 10/2013 | Seo et al. | |
| 2015/0045526 A1 | 2/2015 | Kum et al. | |
| 2016/0257862 A1 | 9/2016 | Yoshimoto et al. | |
| 2016/0326281 A1 | 11/2016 | Kim et al. | |
| 2021/0024729 A1* | 1/2021 | Jun | C08F 210/08 |
| 2021/0155727 A1* | 5/2021 | Gwak | C09J 123/0815 |
| 2021/0163643 A1* | 6/2021 | Gong | C09J 123/08 |
| 2021/0230460 A1* | 7/2021 | Jun | C08F 4/6493 |

FOREIGN PATENT DOCUMENTS

| | | | | |
|---|---|---|---|---|
| CN | 102971346 A | | 3/2013 | |
| CN | 103122042 A | | 5/2013 | |
| CN | 103228721 A | | 7/2013 | |
| CN | 103476888 A | | 12/2013 | |
| CN | 106661142 A | | 5/2017 | |
| EP | 3216795 A1 | | 9/2017 | |
| JP | S61162539 A | | 7/1986 | |
| JP | 2000226561 A | | 8/2000 | |
| JP | 2005-120308 A | * | 5/2005 | ......... C10M 143/04 |
| JP | 2013533351 A | | 8/2013 | |
| JP | 2015120825 A | | 7/2015 | |
| JP | 2018502819 A | | 2/2018 | |
| KR | 20010112350 A | | 12/2001 | |
| KR | 20040076965 A | | 9/2004 | |
| KR | 20070112794 A | | 11/2007 | |
| KR | 20070118087 A | | 12/2007 | |
| KR | 20080099529 A | | 11/2008 | |
| KR | 20100025072 A | | 3/2010 | |
| KR | 20100126712 A | | 12/2010 | |
| KR | 20110024036 A | | 3/2011 | |
| KR | 20110116417 A | | 10/2011 | |
| KR | 101097378 B1 | | 12/2011 | |
| KR | 101289332 B1 | | 7/2013 | |
| KR | 20140019351 A | | 2/2014 | |
| KR | 20160054849 A | | 5/2016 | |
| KR | 20190025438 A | | 3/2019 | |
| WO | 9518158 A1 | | 7/1995 | |
| WO | 2004076502 A1 | | 9/2004 | |

OTHER PUBLICATIONS

European Search Report for Application No. EP19796263, dated Nov. 20, 2020, 8 pages.

International Search Report for Application No. PCT/KR2019/005362 dated Aug. 14, 2019, 3 pages.

International Search Report for Application No. PCT/KR2019/005363 dated Aug. 14, 2019, 2 pages.

Ryabov, "Constrained geometry complexes of titanium (IV) and zirconium (IV) involving cyclopentadienyl fused to thiophene ring." Journal of Organometallic Chemistry, Aug. 5, 2005, pp. 4213-4221, vol. 690, No. 19.

Search Report dated Jun. 22, 22 from Office Action for Chinese Application No. 201980006767.6 dated Jun. 30, 2022. 3 pgs.

Search Report dated Jul. 14, 22 from Office Action for Chinese Application No. 201980021950.3 dated Jul. 22, 2022. 2 pgs.

\* cited by examiner

ADHESIVE COMPOSITION INCLUDING ETHYLENE/ALPHA-OLEFIN COPOLYMER

CROSS-REFERENCE TO RELATED APPLICATIONS

The present application is a national phase entry under 35 U.S.C. § 371 of International Application No. PCT/KR2019/005371 filed May 3, 2019, which claims priority from Korean Patent Application No. 10-2018-0052046 filed May 4, 2018 and Korean Patent Application No. 10-2018-0052043 filed May 4, 2018, all of which are incorporated herein by reference.

TECHNICAL FIELD

The present invention relates to an adhesive composition including an ethylene/alpha-olefin copolymer, and an article including the same.

BACKGROUND ART

Olefin polymerization catalyst systems may be classified into a Ziegler-Natta and metallocene catalyst systems, and these two highly active catalyst systems have been developed in accordance with the characteristics of each. The Ziegler-Natta catalyst has been widely applied in a commercial process since its invention in the 1950s, but is a multi-site catalyst in which many active sites are coexist and has the characteristics of broad molecular weight distribution of a polymer, in addition, since the composition distribution of a comonomer is nonuniform, there are limitations in securing desired physical properties.

Meanwhile, the metallocene catalyst is composed of the combination of a main catalyst having a transition metal compound as a main component and a promoter which is an organometal compound having aluminum as a main component, and such catalyst is a homogeneous complex catalyst and is a single site catalyst. According to the single site properties, a polymer having narrow molecular weight distribution and uniform composition distribution of a comonomer is obtained, and according to the structural deformation of the ligand of a catalyst and polymerization conditions, the steric regularity, copolymerization properties, molecular weight, crystallinity, etc. of a polymer may be changed.

U.S. Pat. No. 5,914,289 discloses a method of controlling the molecular weight and molecular weight distribution of a polymer using metallocene catalysts supported by individual supports, but the amount of a solvent used for preparing a supported catalyst and preparation time are consumed a lot, and there is inconvenience to support the metallocene catalysts used on individual supports.

Korean Patent Application No. 10-2003-0012308 discloses a method of controlling molecular weight distribution by supporting a dinuclear metallocene catalyst and a mononuclear metallocene catalyst together with an activator on a support and polymerizing while changing the combination of the catalysts in a reactor. However, such method has limitations in accomplishing the properties of individual catalysts at the same time, and a metallocene catalyst part is separated from a support component of a completed catalyst, thereby inducing fouling in a reactor.

Meanwhile, a linear low-density polyethylene is prepared by copolymerizing ethylene and alpha olefin using a polymerization catalyst at a low pressure, and is a resin having narrow molecular weight distribution and a short chain branch with a certain length without a long chain branch. A linear low-density polyethylene film has the properties of a common polyethylene, high breaking strength and elongation, and excellent tearing strength and falling weight impact strength, and thus, is increasingly used in a stretch film, an overlap film, etc., to which the conventional low-density polyethylene or high-density polyethylene is difficult to apply.

However, most linear low-density polyethylene using 1-butene or 1-hexene as a comonomer is prepared in a single gas phase reactor or a single loop slurry reactor, and has higher productivity when compared with a process using a 1-octene comonomer. However, the properties of such a product also are greatly inferior to a case using a 1-octene comonomer due to the limitations of catalyst technology used and process technology used, and the molecular weight distribution thereof is narrow, and thus, processability is poor.

U.S. Pat. No. 4,935,474 reports a method of preparing polyethylene having broad molecular weight distribution by using two or more metallocene compounds. U.S. Pat. No. 6,828,394 reports a method of preparing polyethylene having excellent processability and which is particularly suitable as a film, by mixing a comonomer having good bonding properties and a comonomer without them. In addition, U.S. Pat. Nos. 6,841,631 and 6,894,128 indicate that polyethylene having bimodal or multimodal molecular weight distribution is prepared as a metallocene catalyst in which at least two kinds of metal compounds are used, and is applicable to the use of a film, a blow molding, a pipe, etc. However, such products have improved processability but a nonuniform dispersion state by the molecular weight in a unit particle, and extrusion appearance is rough and physical properties are unstable though under relatively good extrusion conditions.

In such a background, the preparation of an excellent product making balance between physical properties and processability is continuously required.

DISCLOSURE OF THE INVENTION

Technical Problem

Accordingly, the present invention is for solving the above-described limitations of the conventional art, and providing an adhesive composition having excellent physical properties and adhesive properties by including an ethylene/alpha-olefin copolymer, though having narrow molecular weight distribution, a low density and ultra low molecular weight properties, of which high crystalline content and low crystalline content are small to show uniform crystallinity distribution.

Technical Solution

In order to solve the above tasks, according to an embodiment of the present invention, there is provided an adhesive composition including an ethylene/alpha-olefin copolymer; and a tackifier, wherein the ethylene/alpha-olefin copolymer satisfies the following conditions i) to iv):

i) density: 0.85 to 0.89 g/cc, ii) molecular weight distribution (MWD): 1.5 to 3.0, iii) viscosity: 6,000 cP to 40,000 cP, if measured at a temperature of 180° C., and iv) crystallization index (CI) according to the following Equation 1: 15 to 25:

$$CI = A^3/B \qquad \text{[Equation 2]}$$

in Equation 1, A is full width at half maximum (FWHM) of a peak shown during measuring crystallization temperature, and B is a numerical value measured as melt index (MI) according to ASTM D-1238 (condition E, 190° C., 2.16 kg load), wherein the numerical value has a unit of "dg/min".

Advantageous Effects

The adhesive composition according to the present invention has excellent heat resistance and adhesive properties at a low temperature by including an ethylene/alpha-olefin copolymer having a low density, an ultra low molecular weight, narrow molecular weight distribution. Accordingly, the adhesive composition of the present invention shows excellent adhesive properties.

BEST MODE FOR CARRYING OUT THE INVENTION

The terminology used herein is for the purpose of describing particular example embodiments only and is not intended to limit the present invention. The singular forms are intended to include the plural forms as well, unless the context clearly indicates otherwise. It will be understood that the terms "comprise" and/or "comprising," when used in this specification, specify the presence of stated features, steps, elements or the combination thereof, but do not preclude the presence or addition of one or more other features, steps, elements or the combination thereof.

The present invention may have various changes and be embodied in various forms, and specific embodiments are illustrated and will be explained in detail below. However, it should be understood that the present invention is not limited to a specific disclosure type, but includes all changes, equivalents and substituents included in the scope and technical range of the present invention.

1. Adhesive Composition

An embodiment of the present invention provides an adhesive composition including an ethylene/alpha-olefin copolymer; and a tackifier, wherein the ethylene/alpha-olefin copolymer satisfies the following conditions i) to iv):

i) density: 0.85 to 0.89 g/cc, ii) molecular weight distribution (MWD): 1.5 to 3.0, iii) viscosity: 4,000 cP to 50,000 cP, if measured at a temperature of 180° C., and iv) crystallization index (CI) according to the following Equation 1: 15 to 25:

$$CI = A^3/B \qquad \text{[Equation 1]}$$

in Equation 1,

A is full width at half maximum (FWHM) of a peak shown during measuring crystallization temperature, and B is a numerical value measured as melt index (MI) according to ASTM D-1238 (condition E, 190° C., 2.16 kg load), wherein the numerical value has a unit of "dg/min".

The adhesive composition of the present invention includes an ethylene/alpha-olefin copolymer having a low density, an ultra low molecular weight, narrow molecular weight distribution, and uniform crystallinity, thereby showing excellent processability and adhesive properties.

Hereinafter, the ethylene/alpha-olefin copolymer and a method for preparing the same will be described first in detail.

(1) Ethylene/Alpha-Olefin Copolymer

An ethylene/alpha-olefin copolymer of the present invention satisfies the following conditions i) to iv):

i) density: 0.85 to 0.89 g/cc, ii) molecular weight distribution (MWD): 1.5 to 3.0, iii) viscosity: 4,000 cP to 50,000 cP, if measured at a temperature of 180° C., and iv) crystallization index (CI) according to the following Equation 1: 15 to 25:

$$CI = A^3/B \qquad \text{[Equation 1]}$$

in Equation 1, A is full width at half maximum (FWHM) of a peak shown during measuring crystallization temperature, and B is a numerical value measured as melt index (MI) according to ASTM D-1238 (condition E, 190° C., 2.16 kg load), wherein the numerical value has a unit of "dg/min".

The crosslinking between copolymers is carried out by vinyl and vinylidene, including double bonds, and the ethylene/alpha-olefin copolymer satisfies the crystallization index in the above-described range through the injection of an optimized amount of hydrogen together with a catalyst which will be explained later during polymerization and the uniform mixing of an alpha-olefin comonomer, which means that the amounts of high crystalline and low crystalline copolymers are small and uniform crystallinity is achieved. Generally, shear fluidization characteristics may be measured through measuring complex viscosity according to frequency, and in such a copolymer, the complex viscosity is kept low in a specific temperature and angular frequency ranges and thus, processability may be significantly excellent.

Particularly, the ethylene/alpha-olefin copolymer of the present invention additionally has a density measured according to ASTM D-792 of 0.85 g/cc to 0.89 g/cc in conditions satisfying the above-described physical properties. Particularly, the density may be 0.855 g/cc or more, or 0.86 g/cc or more, or 0.865 g/cc or more, and 0.89 g/cc or less, or 0.885 g/cc or less, or 0.880 g/cc or less.

Generally, the density of an olefin-based polymer is influenced by the kind and amount of a monomer used during polymerization, a polymerization degree, etc., and a copolymer may be largely influenced by the amount of a comonomer. With the increase of the comonomer, an ethylene/alpha-olefin copolymer having a low density may be prepared, and the amount of the comonomer which is possibly introduced into a copolymer may be dependent on the copolymerization properties of a catalyst, that is, the properties of the catalyst.

In the present invention, a large amount of a comonomer may be introduced due to the use of a catalyst composition including a transition metal compound having a specific structure. As a result, the ethylene/alpha-olefin copolymer of the present invention may have a low density as described above, and as a result, excellent processability may be shown. More particularly, the ethylene/alpha-olefin copolymer may preferably have a density of 0.860 g/cc to 0.885 g/cc, more preferably, a density of 0.865 g/cc to 0.880 g/cc, and in this case, the maintenance of mechanical properties and improving effect of impact strength according to the control of the density are even more remarkable.

The ethylene/alpha-olefin copolymer of the present invention has a viscosity of 50,000 cP or less if measured at 180° C. in conditions satisfying low density properties as described above. More particularly, the viscosity of the ethylene/alpha-olefin copolymer may be 40,000 cP or less, 37,000 cP or less, or 35,000 cP or less, and 4,000 cP or more, or 6,000 cP, or more, or 7,000 cP or more, or 8,500 cP or more.

In addition, the ethylene/alpha-olefin copolymer of the present invention may have molecular weight distribution (MWD) of 1.5 to 3.0. Particularly, the molecular weight distribution may be 2.5 or less, more particularly, 1.7 or more, or 1.8 or more, or 1.9 or more, and 2.3 or less, or 2.1 or less, or 2.0 or less.

Generally, in case of polymerizing two or more kinds of monomers, molecular weight distribution (MWD) increases, and as a result, impact strength and mechanical properties may decrease and blocking phenomenon, etc. may arise. Considering this, in the present invention, an optimal amount of hydrogen is injected during carrying out polymerization reaction, and the molecular weight and molecular weight distribution of the ethylene/alpha-olefin copolymer thus prepared are decreased, and as a result, impact strength, mechanical properties, etc. are improved.

Meanwhile, in the present invention, the weight average molecular weight (Mw) and number average molecular weight (Mn) are polystyrene conversion molecular weights which are analyzed by gel permeation chromatography (GPC), and the molecular weight distribution may be calculated from the ratio of Mw/Mn.

The ethylene/alpha-olefin copolymer of the present invention may be a polymer having an ultra low molecular weight, which has a weight average molecular weight (Mw) of 15,000 to 45,000 g/mol. More particularly, the weight average molecular weight may be 17,000 g/mol or more, or 19,000 g/mol or more, and 40,000 g/mol or less, or 37,000 g/mol or less, or 35,000 g/mol or less.

In addition, the ethylene/alpha-olefin copolymer of the present invention may have a number average molecular weight (Mn) of 5,000 to 35,000. More particularly, the number average molecular weight may be 7,000 or more, or 8,000 or more, or 9,000 or more, and 30,000 or less, or 25,000 or less.

If the weight average molecular weight satisfies the above-described ranges, remarkable improvement of processability may be expected in connection with the viscosity of the adhesive composition including the same. That is, the mechanical properties and impact strength of the ethylene/alpha-olefin copolymer, and the viscosity may be controlled by controlling the kind of a catalyst used and the amount of the catalyst used during polymerization, and with the above-described conditions, improved processability may be shown while keeping excellent mechanical properties.

In addition, the ethylene/alpha-olefin copolymer of the present invention has a crystallization index of 15 to 25 according to Equation 1 in conditions of satisfying the above-described physical properties, and may particularly, 16 or more, or 17.5 or more, or 18.5 or more, and 24 or less, or 23 or less, or 22 or less, or 21 or less.

In Equation 1, A is full width at half maximum (FWHM) of a peak shown during measuring crystallization temperature, and B is a numerical value measured as melt index (MI) according to ASTM D-1238 (condition E, 190° C., 2.16 kg load), wherein the numerical value has a unit of "dg/min".

The FWHM is a value derived from a crystallinity distribution graph drawn by dW/dT values in accordance with temperature measured in bivariate distribution by cross-fractionation chromatography (CFC), and the ethylene/alpha-olefin copolymer may have a value of 30 or less or 23 or less according to the weight average molecular weight or melt index. In case where this FWHM has a relation satisfying the range of the crystallization index which is derived by the melt index and Equation 1, this may afford evidence of quite uniform distribution of crystallinity in the ethylene/alpha-olefin copolymer, and through this, it could be assessed to show excellent physical properties and processability, particularly, processability.

Particularly, as in the ethylene/alpha-olefin copolymer of the present invention, in case of satisfying the conditions, there is a little complex viscosity change in specific ranges of the temperature and shear rate during processing, and significantly excellent processability may be shown. Accordingly, the adhesive composition of the present invention, including the ethylene-alpha olefin copolymer, may have excellent adhesiveness and processability.

In addition, the ethylene/alpha-olefin copolymer may have a Re×Rc value of 1.0 or less. In this case, Re=kee/kec, Rc=kcc/kce, and kee represents a propagation reaction rate constant when ethylene is added to a propagation chain of which terminal active site is an ethylene monomer, kec represents a propagation reaction rate when an alpha olefin comonomer is added to a propagation chain of which terminal active site is an ethylene monomer, kcc represents a propagation reaction rate when an alpha olefin comonomer is added to a propagation chain of which terminal active site is an alpha olefin comonomer, and kce represents a propagation reaction rate constant when an ethylene monomer is added to a propagation chain of which terminal active site is an alpha olefin comonomer.

The propagation reaction rate constants such as kee, kec, kcc and kce may be obtained by measuring the arrangement of monomers using C13 NMR, and through this, Re and Rc may be calculated. If the calculated product value of Re and Rc (Re×Rc) is 1.0 or less, more particularly, 0.95 or less, there is strong possibility that the ethylene/alpha-olefin copolymer is formed into an alternating copolymer, and if the product value of Re and Rc (Re×Rc) is greater than 1.0, there is strong possibility that the ethylene-alpha olefin copolymer is formed as a block copolymer. The term "alternating copolymer" means an alternately polymerized shape of two monomer components composing the copolymer (for example: A, B) (for example: -A-B-A-B-A-B-A-B-), and the term "block copolymer" means a shape in which a block is formed by continuously polymerizing one monomer component (A) in a copolymer and then another block is formed by another monomer component (B) to form a block (for example: -A-A-A-A-B-B-B-B-).

Accordingly, the ethylene-alpha olefin copolymer of the present invention has a product value of Re and Rc (Re×Rc) of 1.0 or less, more particularly, 0.95 or less, and may become an alternating copolymer in which an alpha-olefin comonomer is continuously polymerized and uniformly distributed in a polymer main chain. As described above, since the alpha-olefin comonomer is uniformly distributed in a polymer main chain, excellent structural stability may be shown, and accordingly, complex viscosity change is little in specific ranges of temperature and shear ratio during processing, and significantly excellent processability may be shown. Therefore, the adhesive composition of the present invention including the ethylene-alpha olefin copolymer may also have excellent adhesiveness and processability.

In addition, the melt index (MI) may be 200 dg/min to 1,300 dg/min, particularly, the melt index may be 400 dg/min or more, 500 dg/min or more, and 1,200 dg/min or less, 1,000 dg/min or less.

Conventionally, in order to apply the ethylene/alpha-olefin copolymer to a hot melt adhesive composition, there were attempts to accomplish an ultra low molecular weight, but in case of largely controlling the melt index of a copolymer, there are problems of broadening crystallinity distribution, degrading processability, and deteriorating physical properties.

However, by using a transition metal compound having a specific structure as a catalyst composition and applying a method of injecting hydrogen during polymerization according to the preparation method which will be explained layer, the ethylene/alpha-olefin copolymer of the present invention may have small amounts of high crystalline and low crystalline copolymers and a low complex viscosity at the same temperature, have uniform crystallinity though melt index is controlled high, and have markedly improved physical properties and processability, particularly, processability according to the decrease of the complex viscosity when compared with the conventional method.

In addition, the ethylene/alpha-olefin copolymer of the present invention may have a number of unsaturated functional groups of 0.8 or less per 1000 carbon atoms in the copolymer. More particularly, the number of the unsaturated functional groups may be 0.6 or less, or 0.5 or less, or 0.45 or less, or 0.42 or less, or 0.41 or less, and 0.1 or more, or 0.20 or more or 0.3 or more per 1000 carbon atoms constituting the copolymer. The number of the unsaturated functional groups in the copolymer may be controlled by controlling polymerization temperature and the injection amount of hydrogen during preparation. Since the ethylene/alpha-olefin copolymer according to the present invention has the low number of unsaturated functional groups as described above, excellent long-period physical properties including a little discoloration, and a small molecular weight and viscosity change ratio after storing at a high temperature (heat aging) may be shown.

In the present invention, the number of unsaturated functional groups in the copolymer may be calculated from NMR analysis results. Particularly, the copolymer is dissolved in a chloroform-d (w/TMS) solution, and measurement is performed 16 times at room temperature with an acquisition time of 2 seconds and a pulse angle of 45°, using an Agilent 500 MHz NMR equipment. Then, the TMS peak in 1H NMR is calibrated to 0 ppm, a $CH_3$-related peak (triplet) of 1-octene at 0.88 ppm and a $CH_2$-related peak (broad singlet) of ethylene at 1.26 ppm are confirmed, respectively, and an integration value of the $CH_3$ peak is calibrated to 3 to calculate the contents. In addition, each number could be calculated based on the integration values of the vinyl, vinylene and vinylidene in 4.5-6.0 ppm region.

In addition, the ethylene/alpha-olefin copolymer of the present invention may have a crystallization temperature (Tc) of 45° C. or more. More particularly, the crystallization temperature may be 50° C. or more, or 51° C. or more, and 60° C. or less, or 58° C. or less, or 56° C. or less. The high crystallization temperature as described above is due to the uniform distribution of a comonomer in the ethylene/alpha-olefin copolymer, and with the temperature range, excellent structural stability may be shown.

In addition, the ethylene/alpha-olefin copolymer of the present invention may have a melting temperature (Tm) of 60 to 80° C. More particularly, the melting temperature may be 65° C. or more, or 69° C. or more, or 70° C. or more, and 75° C. or less, or 74.5° C. or less, or 74° C. or less. With the melting temperature in the temperature range as described above, excellent thermal stability may be shown.

In the present invention, the crystallization temperature and melting temperature of the ethylene/alpha-olefin copolymer may be measured using a differential scanning calorimeter (DSC). Particularly, the copolymer is heated to 150° C., kept for 5 minutes, and cooled to 20° C. again, and then, the temperature is elevated again. In this case, the elevating rate and decreasing rate of the temperature are controlled to 10° C./min, respectively, and the results measured in a section where the temperature is secondly elevated is set to the melting temperature, and the results measured in a section where the temperature is decreased is set to the crystallization temperature.

In addition, in the ethylene/alpha-olefin copolymer of the present invention, the alpha-olefin-based monomer which is the comonomer may be an olefin-based monomer of 4 to 20 carbon atoms. Particular example may include propylene, 1-butene, 1-pentene, 4-methyl-1-pentene, 1-hexene, 1-heptene, 1-octene, 1-decene, 1-undecene, 1-dodecene, 1-tetradecene, 1-hexadecene, or 1-eicocene, and these may be used alone or as a mixture of two or more.

Among them, the alpha-olefin monomer may be 1-butene, 1-hexene or 1-octene considering the remarkable improving effects if applied to an adhesive composition, and most preferably, 1-octene may be used.

In addition, in the ethylene/alpha-olefin copolymer, the amount of the alpha-olefin which is a comonomer may be appropriately selected from a range satisfying the above-described physical property conditions, and may be particularly greater than 0 and 99 mol % or less, or 10 to 50 mol %.

An ethylene/alpha-olefin copolymer of the present invention may satisfy the following conditions i) to viii):
  i) density: 0.85 to 0.89 g/cc,
  ii) molecular weight distribution (MWD): 1.5 to 3.0,
  iii) viscosity: 4,000 cP to 50,000 cP, if measured at a temperature of 180° C.,
  iv) total number of unsaturated functional groups per 1,000 carbon atoms: 0.8 or less,
  v) a number average molecular weight (Mn): 9,000 to 25,000,
  vi) Melt index (MI) at 190° C., 2.16 kg load by ASTM D1238: 200 to 1,300 dg/min, and
  vii) crystallization index (CI) according to the following Equation 1: 15 to 25:

$$CI = A^3/B \quad \text{[Equation 1]}$$

in Equation 1, A is full width at half maximum (FWHM) of a peak shown during measuring crystallization temperature, and B is a numerical value measured as melt index (MI) according to ASTM D-1238 (condition E, 190° C., 2.16 kg load), wherein the numerical value has a unit of "dg/min",
  viii) Re×Rc≤1.0
  where Re=kee/kec, Rc=kcc/kce,
  kee represents a propagation reaction rate constant when ethylene is added to a propagation chain of which terminal active site is an ethylene monomer, kec represents a propagation reaction rate when an alpha olefin comonomer is added to a propagation chain of which terminal active site is an ethylene monomer, kcc represents a propagation reaction rate when an alpha olefin comonomer is added to a propagation chain of which terminal active site is an alpha olefin comonomer, and kce represents a propagation reaction rate constant when an ethylene monomer is added to a propagation chain of which terminal active site is an alpha olefin comonomer.

The copolymer described above may accomplish the effects described above, and may have a small number of total unsaturated functional groups, and thus, improvement of effects such as long-period stability may be expected.

(2) Method for Preparing Ethylene/Alpha-Olefin Copolymer

The ethylene/alpha-olefin copolymer having the above-described physical properties may be prepared by a preparation method including a step of polymerizing ethylene and an alpha-olefin-based monomer by injecting hydrogen in 45 to 100 cc/min in the presence of a catalyst composition including a transition metal compound of Formula 1 below.

[Formula 1]

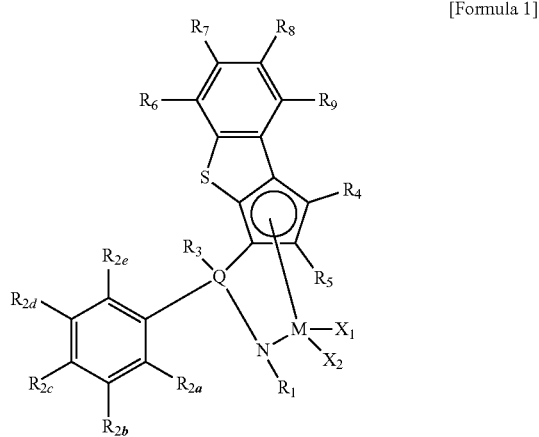

In Formula 1, $R_1$ is hydrogen; alkyl of 1 to 20 carbon atoms; cycloalkyl of 3 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_{2a}$ to $R_{2e}$ are each independently hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; or aryl of 6 to 20 carbon atoms, $R_3$ is hydrogen; halogen; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkyl amido of 1 to 20 carbon atoms; aryl amido of 6 to 20 carbon atoms; or phenyl which is substituted with one or more selected from the group consisting of halogen, alkyl of 1 to 20 carbon atoms, cycloalkyl of 3 to 20 carbon atoms, alkenyl of 2 to 20 carbon atoms, alkoxy of 1 to 20 carbon atoms and aryl of 6 to 20 carbon atoms, $R_4$ to $R_9$ are each independently a metalloid radical of a metal in group 14, which is substituted with hydrogen; silyl; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; or hydrocarbyl of 1 to 20 carbon atoms; where among the $R_6$ to $R_9$, adjacent two or more may be connected with each other to form a ring, Q is Si or C, M is a transition metal in group 4, and $X_1$ and $X_2$ are each independently hydrogen; halogen; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamino of 1 to 20 carbon atoms; or arylamino of 6 to 20 carbon atoms.

In case of including the transition metal compound having the structure of Formula 1 above in a catalyst composition and polymerizing ethylene and an alpha-olefin-based comonomer together with hydrogen, an ethylene/alpha-olefin copolymer having a low density and an ultra low molecular weight may be prepared as described above. Since this ethylene/alpha-olefin copolymer has a crystallization index greater than 15 and less than 25 as described above, the amounts of high crystalline and low crystalline copolymers may be largely decreased, complex viscosity may be decreased, and processability may be largely improved. In addition, equivalent or better physical properties when compared with the conventional art may be maintained. Accordingly, an adhesive composition including the same may have both excellent heat resistance and excellent adhesiveness at a low temperature.

The substituents in Formula 1 will be explained more particularly as follows.

$R_1$ may be hydrogen; alkyl of 1 to 20 carbon atoms; cycloalkyl of 3 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms.

Particularly, $R_1$ may be hydrogen; alkyl of 1 to 12 carbon atoms; cycloalkyl of 3 to 12 carbon atoms; alkoxy of 1 to 12 carbon atoms; aryl of 6 to 12 carbon atoms; arylalkoxy of 7 to 13 carbon atoms; alkylaryl of 7 to 13 carbon atoms; or arylalkyl of 7 to 13 carbon atoms.

More particularly, $R_1$ may be hydrogen or alkyl of 1 to 12 carbon atoms.

$R_{2a}$ to $R_{2e}$ may be each independently hydrogen; halogen; alkyl of 1 to 12 carbon atoms; cycloalkyl of 3 to 12 carbon atoms; alkenyl of 2 to 12 carbon atoms; alkoxy of 1 to 12 carbon atoms; or phenyl.

Particularly, $R_{2a}$ to $R_{2e}$ may be each independently hydrogen; halogen; alkyl of 1 to 12 carbon atoms; cycloalkyl of 3 to 12 carbon atoms; alkenyl of 2 to 12 carbon atoms; alkoxy of 1 to 12 carbon atoms; or phenyl.

More particularly, $R_{2a}$ to $R_{2e}$ may be each independently hydrogen; alkyl of 1 to 12 carbon atoms; or alkoxy of 1 to 12 carbon atoms.

$R_3$ may be hydrogen; halogen; alkyl of 1 to 12 carbon atoms; cycloalkyl of 3 to 12 carbon atoms; alkenyl of 2 to 12 carbon atoms; aryl of 6 to 20 carbon atoms; alkylaryl of 7 to 13 carbon atoms; arylalkyl of 7 to 13 carbon atoms; or phenyl which is substituted with one or more selected from the group consisting of halogen, alkyl of 1 to 12 carbon atoms, cycloalkyl of 3 to 12 carbon atoms, alkenyl of 2 to 12 carbon atoms, alkoxy of 1 to 12 carbon atoms and phenyl.

Particularly, $R_3$ may be hydrogen; halogen; alkyl of 1 to 12 carbon atoms; cycloalkyl of 3 to 12 carbon atoms; alkenyl of 2 to 12 carbon atoms; alkylaryl of 7 to 13 carbon atoms; arylalkyl of 7 to 13 carbon atoms; phenyl; or phenyl which is substituted with one or more selected from the group consisting of halogen, alkyl of 1 to 12 carbon atoms, cycloalkyl of 3 to 12 carbon atoms, alkenyl of 2 to 12 carbon atoms, alkoxy of 1 to 12 carbon atoms and phenyl.

More particularly, $R_3$ may be hydrogen; alkyl of 1 to 12 carbon atoms; or phenyl.

$R_4$ to $R_9$ may be each independently hydrogen; hydrogen; alkyl of 1 to 20 carbon atoms; cycloalkyl of 3 to 20 carbon atoms; aryl of 6 to 20 carbon atoms; alkylaryl of 7 to 20 carbon atoms; or arylalkyl of 7 to 20 carbon atoms.

Particularly, $R_4$ to $R_9$ may be each independently hydrogen; alkyl of 1 to 12 carbon atoms; cycloalkyl of 3 to 12 carbon atoms; aryl of 6 to 12 carbon atoms; alkylaryl of 7 to 13 carbon atoms; or arylalkyl of 7 to 13 carbon atoms.

More particularly, $R_4$ and $R_5$ may be each independently hydrogen; or alkyl of 1 to 12 carbon atoms.

Among the $R_6$ to $R_9$, adjacent two or more may be connected with each other to form an aliphatic ring of 5 to 20 carbon atoms or an aromatic ring of 6 to 20 carbon atoms; and the aliphatic ring or the aromatic ring may be substituted with halogen, alkyl of 1 to 20 carbon atoms, alkenyl of 2 to 12 carbon atoms, or aryl of 6 to 12 carbon atoms.

In addition, among the $R_6$ to $R_9$, adjacent two or more may be connected with each other to form an aliphatic ring of 5 to 12 carbon atoms or an aromatic ring of 6 to 12 carbon atoms; and the aliphatic ring or the aromatic ring may be substituted with halogen, alkyl of 1 to 12 carbon atoms, alkenyl of 2 to 12 carbon atoms, or aryl of 6 to 12 carbon atoms.

More particularly, $R_6$ to $R_9$ may be each independently hydrogen or methyl.

In addition, Q may be Si, and M may be Ti.

$X_1$ and $X_2$ may be each independently hydrogen; halogen; alkyl of 1 to 12 carbon atoms; cycloalkyl of 3 to 12 carbon atoms; alkenyl of 2 to 12 carbon atoms; aryl of 6 to 12 carbon atoms; alkylaryl of 7 to 13 carbon atoms; arylalkyl of 7 to 13 carbon atoms; alkylamino of 1 to 13 carbon atoms; or arylamino of 6 to 12 carbon atoms.

Particularly, $X_1$ and $X_2$ may be each independently hydrogen; halogen; alkyl of 1 to 12 carbon atoms; or alkenyl of 2 to 12 carbon atoms.

More particularly, $X_1$ and $X_2$ may be each independently hydrogen; or alkyl of 1 to 12 carbon atoms.

The transition metal compound of Formula 1 forms a structure in which cyclopentadiene fused with benzothiophene via a cyclic type bond, and an amido group ((N—$R_1$) are stably crosslinked by Q (Si or C), and a transition metal in group 4 makes a coordination bond. If the catalyst composition is applied for polymerizing an olefin, a polyolefin having high activity, a high molecular weight and properties such as a high copolymerization degree at a high polymerization temperature may be produced.

Further, in the transition metal compound of Formula 1, as the amido group (N—$R_1$) is crosslinked by Q (Si, C), since Q is bonded to a substituted or unsubstituted phenyl group, more stable crosslinking may be achieved and electronically excellent stability may be achieved if making coordination bond with a transition metal.

Since the transition metal compound having the above-described structure has excellent copolymerization properties due to the phenyl group, a copolymer having a low density may be prepared with a smaller amount of a comonomer with respect to a catalyst which has not a core structure like the transition metal compound of Formula 1, and at the same time, since a molecular weight degree is excellent and polymerization at a high temperature is possible, there are advantages of injecting hydrogen stably.

That is, the transition metal compound is used but an optimized amount of hydrogen is injected during polymerization reaction in the present invention, and thus, an ethylene/alpha-olefin copolymer having an ultra low molecular weight, narrow molecular weight distribution and uniform comonomer distribution may be provided. Due to the electronic/structural stability of the transition metal compound, the inclusion of hydrogen is advantageous. Accordingly, termination reaction is performed uniformly in polymerization reaction due to hydrogen, and effects of preparing a copolymer having narrow molecular weight distribution and an ultra low molecular weight may be achieved.

Even further particularly, particular examples of the compound of Formula 1 may include a compound represented by any one among the structures below, but the present invention is not limited thereto.

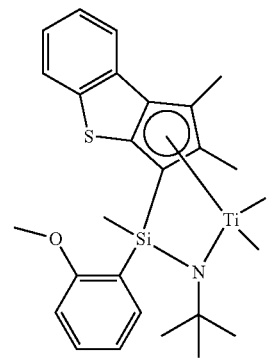

[Formula 1-1]

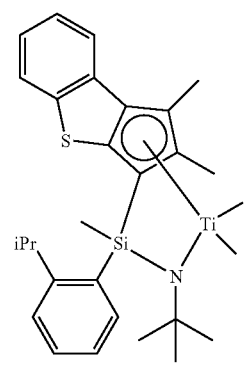

[Formula 1-2]

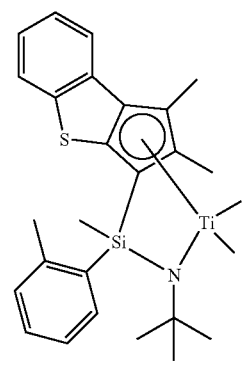

[Formula 1-3]

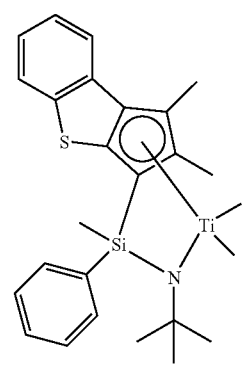

[Formula 1-4]

[Formula 1-5]

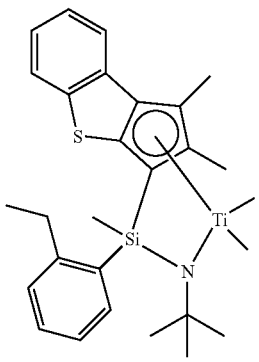

[Formula 1-6]

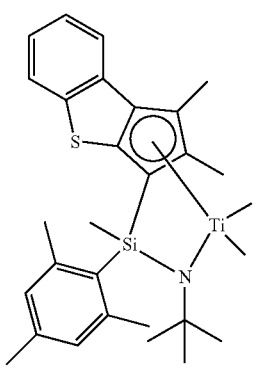

[Formula 1-7]

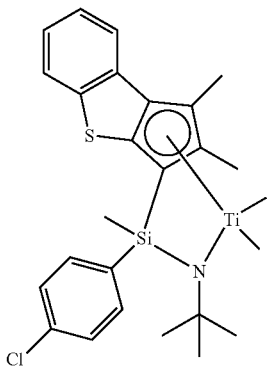

[Formula 1-8]

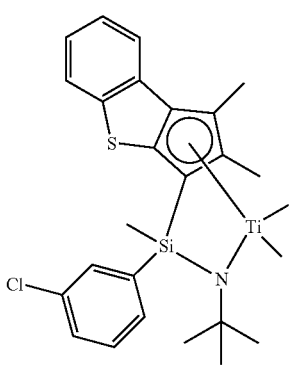

[Formula 1-9]

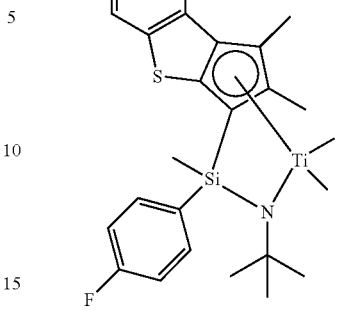

[Formula 1-10]

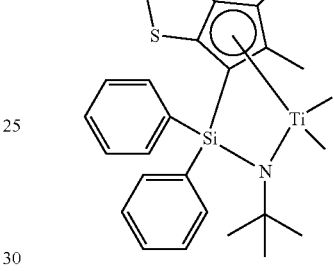

Meanwhile, in the preparation of the ethylene/alpha-olefin copolymer of the present invention, the catalyst composition may further include a promoter for activating the transition metal compound of Formula 1 above.

The promoter is an organometal compound including a metal in group 13, and particularly may include one or more among a compound of the following Formula 2, a compound of the following Formula 3, and a compound of the following Formula 4:

$$R_{41}-[Al(R_{42})-O]_n-R_{43} \quad \text{[Formula 2]}$$

in Formula 2, $R_{41}$, $R_{42}$ and $R_{43}$ are each independently any one among hydrogen, halogen, a hydrocarbyl group of 1 to 20 carbon atoms, and a halogen-substituted hydrocarbyl group of 1 to 20 carbon atoms, and n is an integer of 2 or more, $$D(R_{44})_3 \quad \text{[Formula 3]}$$

in Formula 3, D is aluminum or boron, and each $R_{44}$ is each independently any one among halogen, a hydrocarbyl group of 1 to 20 carbon atoms, and a halogen-substituted hydrocarbyl group of 1 to 20 carbon atoms, $$[L-H]^+[Z(A)_4]^- \text{ or } [L]^+[Z(A)_4]^- \quad \text{[Formula 4]}$$

in Formula 4,

L is a neutral or cationic Lewis acid; H is a hydrogen atom, and

Z is an element in group 13, and A is each independently a hydrocarbyl group of 1 to 20 carbon atoms; a hydrocarbyloxy group of 1 to 20 carbon atoms; and any one among substituents of which one or more hydrogen atoms are substituted with one or more substituents among halogen, a hydrocarbyloxy group of 1 to 20 carbon atoms, and a hydrocarbylsilyl group of 1 to 20 carbon atoms.

More particularly, the compound of Formula 2 may be an alkylaluminoxane-based compound in which repeating units are combined into a linear, circular or network type, and particular examples may include methylaluminoxane (MAO), ethylaluminoxane, isobutylaluminoxane or tert-butylalminoxane.

In addition, particular examples of the compound of Formula 3 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron or tributylboron, and particularly, may be selected from trimethylaluminum, triethylaluminum or triisobutylaluminum.

In addition, the compound of Formula 4 may include a trisubstituted ammonium salt, dialkyl ammonium salt, or trisubstituted phosphonium type borate-based compound. More particular examples may include a trisubstituted ammonium salt type borate-based compound such as trimetalammonium tetraphenylborate, methyldioctadecylammonium tetraphenylborate, triethylammonium tetraphenylborate, tripropylammonium tetraphenylborate, tri(n-butyl)ammonium tetraphenylborate, methyltetradecyclooctadecylammonium tetraphenylborate, N,N-dimethylanilium tetraphenylborate, N,N-diethylanilium tetraphenylborate, N,N-dimethyl(2,4,6-trimethylanilium)tetraphenylborate, trimethylammonium tetrakis(pentafluorophenyl)borate, methylditetradecylammonium tetrakis(pentaphenyl)borate, methyldioctadecylammonium tetrakis(pentafluorophenyl)borate, triethylammonium, tetrakis(pentafluorophenyl)borate, tripropylammoniumtetrakis(pentafluorophenyl)borate, tri(n-butyl)ammonium tetrakis(pentafluorophenyl)borate, tri(sec-butyl)ammoniumtetrakis(pentafluorophenyl)borate, N,N-dimethylanilium tetrakis(pentafluorophenyl)borate, N,N-diethylaniliumtetrakis(pentafluorophenyl)borate, N,N-dimethyl(2,4,6-trimethylanilium)tetrakis(pentafluorophenyl)borate, trimethylammoniumtetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilium tetrakis(2,3,4,6-tetrafluorophenyl)borate, N,N-diethylanilium tetrakis(2,3,4,6-tetrafluorophenyl)borate, and N,N-dimethyl-(2,4,6-trimethylanilium)tetrakis-(2,3,4,6-tetrafluorophenyl)borate; a dialkylammonium salt type borate-based compound such as dioctadecylammonium tetrakis(pentafluorophenyl)borate, ditetradecylammonium tetrakis(pentafluorophenyl)borate, and dicyclohexylammonium tetrakis(pentafluorophenyl)borate; or a trisubstituted phosphonium salt type borate-based compound such as triphenylphosphonium tetrakis(pentafluorophenyl)borate, methyldioctadecylphosphonium tetrakis(pentafluorophenyl)borate, and tri(2,6-dimethylphenyl)phosphoniumtetrakis(pentafluorophenyl)borate.

By using such a promoter, the molecular weight distribution of a finally prepared ethylene/alpha-olefin copolymer may become more uniform, and polymerization activity may be improved.

The promoter may be used in an appropriate amount so that the activation of the transition metal compound of Formula 1 may be sufficiently proceeded.

In addition, the catalyst composition may include the transition metal compound of Formula 1 in a supported state on a support.

If the transition metal compound of Formula 1 is supported on a support, the weight ratio of the transition metal compound to the support may be 1:10 to 1:1,000, more preferably, 1:10 to 1:500. If the support and the transition metal compound are included in the weight ratio range, an optimized shape may be shown. In addition, if the promoter is supported together on the support, the weight ratio of the promoter to the support may be 1:1 to 1:100, more preferably, 1:1 to 1:50. If the promoter and the support are included in the weight ratio, catalyst activity may be improved, and the minute structure of the polymer thus prepared may be optimized.

Meanwhile, the support may use silica, alumina, magnesia or a mixture thereof, or these materials may be used after removing moisture from the surface by drying at a high temperature, in a state where a hydroxyl group or a siloxane group, which have high reactivity, are included. In addition, the support dried at a high temperature may further include an oxide such as $Na_2O$, $K_2CO_3$, $BaSO_4$ and $Mg(NO_3)_2$, a carbonate, a sulfate, or a nitrate component.

The drying temperature of the support is preferably, from 200 to 800° C., more preferably, from 300 to 600° C., most preferably, from 300 to 400° C. If the drying temperature of the support is less than 200° C., humidity is too high and water at the surface may react with the promoter, and if the temperature is greater than 800° C., the pores at the surface of the support may be combined to decrease the surface area, and a large amount of the hydroxyl groups at the surface may be removed to remain only siloxane groups to decrease reaction sites with the promoter, undesirably.

In addition, the amount of the hydroxyl group at the surface of the support may preferably be 0.1 to 10 mmol/g, and more preferably, 0.5 to 5 mmol/g. The amount of the hydroxyl group at the surface of the support may be controlled by the preparation method and conditions of the support, or drying conditions such as temperature, time, vacuum and spray drying.

Meanwhile, the polymerization reaction of the ethylene/alpha-olefin copolymer may be performed by continuously injecting hydrogen and continuously polymerizing ethylene and an alpha-olefin-based monomer in the presence of the catalyst composition.

In this case, the hydrogen gas restrains the rapid reaction of the transition metal compound at an initial stage of polymerization and plays the role of terminating polymerization reaction. Accordingly, by the use of such hydrogen gas and the control of the amount thereof used, an ethylene/alpha-olefin copolymer having narrow molecular weight distribution with an ultra low molecular weight may be effectively prepared.

The hydrogen gas may be injected in 45 to 100 cc/min, more particularly, 50 to 95 cc/min. If the hydrogen gas is injected under the above-described conditions, the ethylene/alpha-olefin polymer thus prepared may accomplish the physical properties in the present invention. If the hydrogen gas is injected in an amount less than 45 cc/min, the termination of the polymerization reaction may not homogeneously carried out, and the preparation of an ethylene/alpha-olefin copolymer having desired physical properties may become difficult, and if the amount is greater than 100 cc/min, the terminating reaction may arise excessively fast, and it is apprehended that an ethylene/alpha-olefin copolymer having an excessively small molecular weight may be prepared.

In addition, the polymerization reaction may be performed at 80 to 200° C., but by controlling the injection amount of the hydrogen together with the polymerization temperature, the number of unsaturated functional groups in the ethylene/alpha-olefin copolymer and the monomer reactivity ratio may be controlled even more advantageously. Accordingly, particularly, the polymerization reaction may be carried out at 100 to 150° C., more particularly, 100 to 140° C.

In addition, during the polymerization reaction, an organoaluminum compound is further injected to remove moisture in a reactor, and the polymerization reaction may be performed in the presence of the compound. Particular examples of such organoaluminum compound may include trialkyl aluminum, dialkyl aluminum halide, alkyl aluminum dihalide, aluminum dialkyl hydride or alkyl aluminum sesquihalide, etc., and more particular examples may include $Al(C_2H_5)_3$, $Al(C_2H_5)_2H$, $Al(C_3H_7)_3$, $Al(C_3H_7)_2H$, $Al(i-C_4H_9)_2H$, $Al(C_8H_{17})_3$, $Al(C_{12}H_{25})_3$, $Al(C_2H_5)(C_{12}H_{25})_2$, $Al(i-C_4H_9)(C_{12}H_{25})_2$, $Al(i-C_4H_9)_2H$, $Al(i-C_4H_9)_3$, $(C_2H_5)_2AlCl$, $(i-C_3H_9)_2AlCl$ or $(C_2H_5)_3Al_2Cl_3$. Such an organoaluminum compound may be continuously injected into the reactor, and for appropriate removal of humidity, the organoaluminum compound may be injected in a ratio of about 0.1 to 10 mole per 1 kg of a reaction medium injected into the reactor.

In addition, a polymerization pressure may be about 1 to about 100 Kgf/cm$^2$, preferably, about 1 to about 50 Kgf/cm$^2$, more preferably, about 5 to about 30 Kgf/cm$^2$.

In addition, if the transition metal compound is used in a supported state on a support, the transition metal compound may be injected after being dissolved or diluted in an aliphatic hydrocarbon solvent of 5 to 12 carbon atoms, for example, pentane, hexane, heptane, nonane, decane, and isomers thereof, an aromatic hydrocarbon solvent such as toluene and benzene, a chlorine atom-substituted hydrocarbon solvent such as dichloromethane and chlorobenzene, etc. The solvent used herein is preferably used after removing a small amount of water or air, which acts as a catalyst poison, by treating with a small amount of alkyl aluminum, and a promoter may be further used.

The ethylene/alpha-olefin copolymer prepared by the above-described preparation method has narrow molecular weight distribution together with an ultra low molecular weight, and at the same time, the crystallization index satisfies greater than 15 and less than 25, and fulfills conditions by which crystallinity may be excellent. Accordingly, a low viscosity may be maintained at a high temperature, and accordingly, an adhesive composition including the same may accomplish excellent processability and adhesive properties.

(3) Additional Components of Adhesive Composition

The adhesive composition of the present invention may further include a tackifier in addition to the ethylene/alpha-olefin copolymer.

The tackifier may be an aliphatic hydrocarbon resin, for example, may be selected from a modified C5 hydrocarbon resin (C5/C9 resin), a styrenated teflon resin, a totally or partially hydrogenated C9 hydrocarbon resin, a hydrogenated alicyclic hydrocarbon resin, a hydrogenated aromatic modified alicyclic hydrocarbon resin and a mixture thereof.

The tackifier may be included in 5 parts by weight to 70 parts by weight with respect to 100 parts by weight of the adhesive composition, without specific limitation, and may particularly be included in 20 parts by weight to 70 parts by weight. If the tackifier is included in less than 5 parts by weight, the viscosity of the adhesive composition may increase, and processability may be degraded, and if the amount is greater than 70 parts by weight, heat resistance may be deteriorated.

The ethylene/alpha-olefin copolymer may be included in 10 parts by weight to 50 parts by weight, particularly, 15 parts by weight to 30 parts by weight with respect to 100 parts by weight of the adhesive composition. If the above numerical range is satisfied, excellent adhesive properties may be maintained.

In addition, the adhesive composition may further include a plasticizer. The plasticizer is not specifically limited, but may be a paraffinic or naphthenic plasticized oil. Particularly, a low molecular weight polymer such as an olefin oligomer, liquid polybutene, polyisoprene copolymer, liquid styrene-isoprene copolymer and liquid hydrogenated styrene-conjugated diene copolymer, vegetable oil and its derivative, or microcrystalline wax, may be used.

The plasticizer may be included in 10 parts by weight to 50 parts by weight, particularly, 20 parts by weight to 40 parts by weight with respect to 100 parts by weight of the adhesive composition, without specific limitation. If the plasticizer is included in less than 10 parts by weight, the viscosity of the adhesive composition may increase to deteriorate processability, and if the amount is greater than 50 parts by weight, adhesive properties may be degraded.

In addition, the adhesive composition may further include an antioxidant for increasing heat resistance and improving color sense.

In this case, the antioxidant may use commonly known antioxidants in the art without specific limitation, and may be included in 0.01 parts by weight to 5 parts by weight, or 0.01 parts by weight to 1 part by weight, or 0.05 parts by weight to 0.75 parts by weight with respect to 100 parts by weight of the adhesive composition.

In addition, the adhesive composition may further include one or more selected from the group consisting of a UV stabilizer, a colorant or pigment, a filler, a fluidization aid, a coupling agent, a crosslinking agent, a surfactant, a solvent and the combination thereof.

The filler may be selected from sand, talc, dolomite, calcium carbonate, clay, silica, mica, wollastonite, feldspar, aluminum silicate, alumina, hydrated alumina, glass bead, glass microsphere, ceramic microsphere, thermoplastic microsphere, barite, wood flour, the combination thereof, and the filler may be present in an amount of 80 wt % or less of the total composition.

An embodiment of the present invention provides an article including a substrate coated with the adhesive composition. The article may be selected from a tape, a label, a transfer paper, a box, a board, a tray, a medical device, a bandage, and a hygiene product, without limitation.

MODE FOR CARRYING OUT THE INVENTION

EXAMPLES

Hereinafter, preferred embodiments will be suggested to assist the understanding of the present invention. However, the embodiments are provided only for easy understanding of the present invention, and the contents of the present invention is not limited thereto.

Synthetic Example

Preparation of Transition Metal Compound

Step 1: Preparation of Ligand Compound (1a-1)

To a 250 mL schlenk flask, 10 g (1.0 eq, 49.925 mmol) of 1,2-dimethyl-3H-benzo[b]cyclopenta[d]thiophene and 100 mL of THF were put, and 22 mL (1.1 eq, 54.918 mmol, 2.5 M in hexane) of n-BuLi was added thereto dropwisely at −30° C., followed by stirring at room temperature for 3 hours. A stirred Li-complex THF solution was cannulated into a schlenk flask containing 8.1 mL (1.0 eq, 49.925 mmol) of dichloro(methyl) (phenyl)silane and 70 mL of THF at −78° C., followed by stirring at room temperature overnight. After stirring, drying in vacuum was carried out and extraction with 100 ml of hexane was carried out.

To 100 ml of an extracted chloro-1-(1,2-dimethyl-3H-benzo[b]cyclopenta[d]thiophene-3-yl)-1,1-(methyl) (phenyl)silane hexane solution, 42 mL (8 eq, 399.4 mmol) of t-BuNH$_2$ was injected at room temperature, followed by stirring at room temperature overnight. After stirring, drying in vacuum was carried out and extraction with 150 ml of hexane was carried out. After drying the solvents, 13.36 g (68%, dr=1:1) of a yellow solid was obtained.

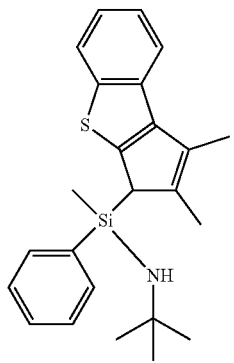

(1a-1)

$^1$H NMR (CDCl$_3$, 500 MHz): δ 7.93 (t, 2H), 7.79 (d, 1H), 7.71 (d, 1H), 7.60 (d, 2H), 7.48 (d, 2H), 7.40-7.10 (m, 10H, aromatic), 3.62 (s, 1H), 3.60 (s, 1H), 2.28 (s, 6H), 2.09 (s, 3H), 1.76 (s, 3H), 1.12 (s, 18H), 0.23 (s, 3H), 0.13 (s, 3H)

Step 2: Preparation of Transition Metal Compound (1a)

To a 100 mL schlenk flask, 4.93 g (12.575 mmol, 1.0 eq) of a ligand compound of Formula 1a-1 and 50 mL (0.2 M) of toluene were put and 10.3 mL (25.779 mmol, 2.05 eq, 2.5 M in hexane) of n-BuLi was added thereto dropwisely at −30° C., followed by stirring at room temperature overnight. After stirring, 12.6 mL (37.725 mmol, 3.0 eq, 3.0 M in diethyl ether) of MeMgBr was added thereto dropwisely, 13.2 mL (13.204 mmol, 1.05 eq, 1.0 M in toluene) of TiCl$_4$ was put in order, followed by stirring at room temperature overnight. After stirring, drying in vacuum and extraction with 150 mL of hexane were carried out, the solvents were removed to 50 mL, and 4 mL (37.725 mmol, 3.0 eq) of DME was added dropwisely, followed by stirring at room temperature overnight. Again, drying in vacuum and extraction with 150 mL of hexane were carried out. After dying the solvents, 2.23 g (38%, dr=1:0.5) of a brown solid was obtained.

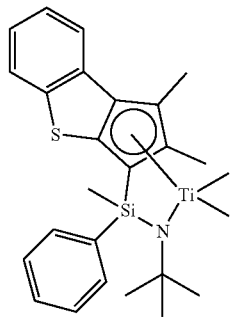

(1a)

$^1$H NMR (CDCl$_3$, 500 MHz): δ 7.98 (d, 1H), 7.94 (d, 1H), 7.71 (t, 6H), 7.50-7.30 (10H), 2.66 (s, 3H), 2.61 (s, 3H), 2.15 (s, 3H), 1.62 (s, 9H), 1.56 (s, 9H), 1.53 (s, 3H), 0.93 (s, 3H), 0.31 (s, 3H), 0.58 (s, 3H), 0.51 (s, 3H), −0.26 (s, 3H), −0.39 (s, 3H)

[Preparation of Ethylene/Alpha-Olefin Copolymer]

Preparation Example 1

Into a 1.5 L autoclave continuous process reactor, a hexane solvent (5.0 kg/h) and 1-octene (1.20 kg/h) were charged, and the top of the reactor was pre-heated to a temperature of 150° C. A triisobutylaluminum compound (0.5 mmol/min), the transition metal compound (1a) (0.40 μmol/min) prepared in the Synthetic Example as a catalyst, and a dimethylanilium tetrakis(pentafluorophenyl) borate promoter (2.40 μmol/min) were injected into the reactor at the same time. Then, into the autoclave reactor, ethylene (0.87 kg/h) and a hydrogen gas (85 cc/min) were injected and copolymerization reaction was continuously carried out while maintaining a pressure of 89 bar and a polymerization temperature of 123.9° C. for 60 minutes or more to prepare a copolymer.

Then, a remaining ethylene gas was exhausted out and the copolymer-containing solution thus obtained was dried in a vacuum oven for 12 hours or more. The physical properties of the copolymer thus obtained were measured.

Preparation Examples 2 to 11 and Comparative Preparation Examples 1, 5 to 12

Polymers were prepared by carrying out the same method as in Preparation Example 1 except that the reactant materials were injected in amounts listed in Table 1 below.

Comparative Preparation Example 2

Product name GA1950 (2017, The Dow Chemical Company) was applied as an ethylene/alpha-olefin copolymer.

Comparative Preparation Example 3

Product name GA1950 (2016, The Dow Chemical Company) was applied as an ethylene/alpha-olefin copolymer.

Comparative Preparation Example 4

Product name GA1900 (The Dow Chemical Company) was applied as an ethylene/alpha-olefin copolymer.

TABLE 1

| | Catalyst injection amount (μmol/min) | Promoter injection amount (μmol/min) | 1-C8 injection amount (kg/h) | TiBAl (mmol/min) | Polymerization temperature (° C.) | H₂ injection amount (cc/min) |
|---|---|---|---|---|---|---|
| Preparation Example 1 | 0.4 | 2.4 | 1.2 | 0.5 | 123.9 | 85 |
| Preparation Example 2 | 0.4 | 2.4 | 1.05 | 0.5 | 125 | 69 |
| Preparation Example 3 | 0.3 | 0.9 | 1.6 | 0.5 | 124.1 | 95 |
| Preparation Example 4 | 0.2 | 0.6 | 1.1 | 0.05 | 125 | 85 |
| Preparation Example 5 | 0.35 | 1.05 | 0.93 | 0.03 | 140 | 55 |
| Preparation Example 6 | 0.4 | 1.2 | 1.0 | 0.05 | 125 | 75 |
| Preparation Example 7 | 0.4 | 1.2 | 1.0 | 0.05 | 125 | 50 |
| Preparation Example 8 | 0.4 | 1.2 | 1.0 | 0.05 | 125 | 80 |
| Preparation Example 9 | 0.4 | 1.2 | 1.0 | 0.05 | 125 | 95 |
| Preparation Example 10 | 0.35 | 1.05 | 1.15 | 0.05 | 145 | 50 |
| Preparation Example 11 | 0.35 | 1.05 | 1.15 | 0.05 | 145 | 55 |
| Comparative Preparation Example 1 | 0.2 | 3.9 | 1.8 | 0.5 | 160 | 0 |
| Comparative Preparation Example 5 | 0.65 | 1.95 | 2.20 | 0.05 | 150 | 0 |
| Comparative Preparation Example 6 | 0.26 | 0.78 | 1.2 | 0.05 | 125 | 35 |
| Comparative Preparation Example 7 | 0.4 | 1.2 | 1.0 | 0.05 | 125 | 130 |
| Comparative Preparation Example 8 | 0.7 | 2.1 | 2.0 | 0.05 | 150 | 0 |
| Comparative Preparation Example 9 | 0.4 | 1.2 | 1.0 | 0.05 | 125 | 0 |
| Comparative Preparation Example 10 | 0.4 | 1.2 | 1.0 | 0.05 | 125 | 10 |
| Comparative Preparation Example 11 | 0.4 | 1.2 | 1.0 | 0.05 | 125 | 15 |
| Comparative Preparation Example 12 | 0.65 | 1.95 | 2.2 | 0.05 | 160 | 0 |

*In Comparative Preparation Examples 5, 6 and 12, [Me₂Si(Me₄C₅)NtBu]Ti(CH₃)₂ was used as a catalyst.

With respect to the ethylene/alpha-olefin copolymers prepared in the Preparation Examples and the Comparative Preparation Examples, physical properties were measured according to the methods described below and are shown in Table 2.

1) Density (g/cm³): measured according to ASTM D-792.
2) Viscosity (cP): measured using a Brookfield RVDV3T viscometer and according to the method described below. In detail, 13 ml of a specimen was put in a specimen chamber and heated to 180° C. using Brookfield Thermosel. After the specimen was completely dissolved, a viscometer equipment was lowered to fix a spindle to the specimen chamber, the rotation speed of the spindle (SC-29 high temperature-melt spindle) was fixed to 20 rpm, and viscosity values were deciphered for 20 minutes or more, or until the value was stabilized, and a final value was recorded.
3) Melt index (MI, dg/min): the melt index (MI) of a polymer was measured according to ASTM D-1238 (condition E, 190° C., 2.16 kg load).
4) Weight average molecular weight (g/mol) and molecular weight distribution (MWD): a number average molecular weight (Mn) and a weight average molecular weight (Mw) were measured, respectively, by gel permeation chromatography (GPC, PL GPC220) under the conditions below, and molecular weight distribution was calculated through dividing the weight average molecular weight by the number average molecular weight:
  Column: PL Olexis
  Solvent: trichlorobenzene (TCB)
  Flow rate: 1.0 ml/min
  Specimen concentration: 1.0 mg/ml
  Injection amount: 200 μl
  Column temperature: 160° C.
  Detector: Agilent High Temperature RI detector
  Standard: Polystyrene (calibrated by cubic function)
5) Full width at half maximum (FWHM) of crystallization peak: A measurement apparatus was CFC of PolymerChar Co. First, a solution of a copolymer was completely dissolved using o-dichlorobenzene as a solvent in an oven in a CFC analyzer at 130° C. for 60 minutes, and the solution was poured into a TREF column which was controlled to 135° C. Then, the temperature was cooled to 95° C., and stabilization was performed in this situation for 45 minutes. Then, the temperature of the TREF column was decreased to −20° C. in a rate of 0.5° C./min, and was maintained at −20° C. for minutes. After that, an elution amount (mass %) was measured using an infrared spectrophotometer. Then, an operation for elevating the temperature of the TREF column in a rate of 20° C./mi to a predetermined temperature and maintaining the temperature for a predetermined time (that is, about 27 minutes), was repeated until the temperature of TREF reached 130° C. The amount of a fractionation (mass %) eluted during each temperature range was measured. The molecular weight (Mw) was measured by the same GPC measurement principle except for forwarding eluted fraction in each temperature to a GPC column and using o-dichlorobenzene as a solvent. The FWHM value was calculated after fitting the elution amount graph in accordance with the temperature obtained through CFC (dW/dT vs T) into a Gaussian curve shape on a program (Origin).

6) Crystallization index (CI): calculated through Equation 1 below using the melt index and FWHM measured.

$$CI = A^3/B \quad \text{[Equation 1]}$$

in Equation 1, A is full width at half maximum (FWHM) of a peak shown during measuring crystallization temperature, and B is a numerical value measured as melt index (MI) according to ASTM D-1238 (condition E, 190° C., 2.16 kg load), wherein the numerical value has a unit of "dg/min".

7) Melting temperature (Tm, ° C.): The melting temperature of a polymer was measured using a differential scanning calorimeter (DSC, apparatus name: DSC 2920, manufacturer: TA instrument). Particularly, the polymer was heated to 150° C., kept for 5 minutes, and cooled to −100° C., and then, the temperature was elevated again. In this case, the elevating rate and decreasing rate of the temperature were controlled to 10° C./min, respectively. The maximum point of an endothermic peak measured in a second elevating section of the temperature was set to the melting temperature.

8) Crystallization temperature (Tc, ° C.): performed by the same method as that for measuring the melting temperature using DSC. From a curve represented while decreasing the temperature, the maximum point of an exothermic peak was set to crystallization temperature.

9) Measurement of monomer reactivity ratios (Re, Rc): About 0.4 ml of each of the ethylene-alpha olefin copolymers prepared in Preparation Examples 4, and 6-11 and Comparative Preparation Examples 6 and 12 was dissolved in a solvent (1,1,2,2-tetrachloroethane-d2 (TCE-d2) and put in a tube which has a diameter of 5 mm and a length of 18 cm. Then, the tube was disposed in a 13C NMR spectrometer, and kee, kec, kcc and kce values were measured in conditions of a frequency of 150 MHz, a temperature of 100° C., a d1 (relaxation delay time) of 3 s, and Scans 4 K in the spectrometer. By substituting the values into Equations 2 and 3 below, the monomer reactivity ratios were calculated.

$$Re \text{ (reactivity ratio of ethylene monomer)} = kee/kec \quad \text{[Equation 2]}$$

$$Rc \text{ (reactivity ratio of alpha olefin comonomer)} = kcc/kce \quad \text{[Equation 3]}$$

(In Equations 2 and 3, kee represents a propagation reaction rate constant when ethylene is added to a propagation chain of which terminal active site is an ethylene monomer, kec represents a propagation reaction rate when an alpha olefin comonomer is added to a propagation chain of which terminal active site is an ethylene monomer, kcc represents a propagation reaction rate when an alpha olefin comonomer is added to a propagation chain of which terminal active site is an alpha olefin comonomer, and kce represents a propagation reaction rate constant when an ethylene monomer is added to a propagation chain of which terminal active site is an alpha olefin comonomer.)

TABLE 2

|  | Density (g/cc) | Viscosity (cP) | Melt index (dg/min) | FWHM | CI | Mw (g/mol) | MWD | Tc/Tm (° C.) |
|---|---|---|---|---|---|---|---|---|
| Preparation Example 1 | 0.877 | 15950 | 544 | 21.71 | 18.81 | 22,900 | 1.94 | 53.8/70.3 |
| Preparation Example 2 | 0.876 | 14850 | 591 | 22.97 | 20.51 | 23,000 | 1.98 | 52.1/68.9 |
| Preparation Example 3 | 0.871 | 7300 | 1149 | 28.52 | 20.19 | 19,000 | 1.98 | 49.1/65.0 |
| Preparation Example 4 | 0.875 | 17000 | 500 | 21.38 | 19.54 | 24,500 | 1.96 | 52.2/68.3 |
| Preparation Example 5 | 0.875 | 16500 | 528 | 20.67 | 16.73 | 23,000 | 2.01 | 52.3/68.5 |
| Preparation Example 6 | 0.875 | 16850 | 509 | 21.62 | 19.85 | 24,400 | 1.96 | 52.0/68.1 |
| Preparation Example 7 | 0.873 | 35000 | 250 | 18.21 | 24.15 | 34,900 | 1.98 | 50.6/66.5 |
| Preparation Example 8 | 0.876 | 13500 | 698 | 23.59 | 18.81 | 22,400 | 1.98 | 52.3/68.9 |

TABLE 2-continued

|  | Density (g/cc) | Viscosity (cP) | Melt index (dg/min) | FWHM | CI | Mw (g/mol) | MWD | Tc/Tm (° C.) |
|---|---|---|---|---|---|---|---|---|
| Preparation Example 9 | 0.877 | 8500 | 989 | 27.23 | 20.41 | 19,500 | 1.77 | 53.2/69.7 |
| Preparation Example 10 | 0.876 | 13500 | 698 | 24.14 | 20.15 | 22,300 | 2.00 | 52.2/68.8 |
| Preparation Example 11 | 0.876 | 8800 | 966 | 27.79 | 22.22 | 19,700 | 1.99 | 52.5/69.1 |
| Comparative Preparation Example 1 | 0.875 | 15800 | 550 | 24.67 | 27.3 | 23,700 | 2.29 | 51.8/67.9 |
| Comparative Preparation Example 2 | 0.875 | 15600 | 558 | 26.22 | 32.3 | 24,000 | 1.96 | 52.3/68.7 |
| Comparative Preparation Example 3 | 0.875 | 15700 | 554 | 25.68 | 30.57 | 24,100 | 1.98 | 52.4/68.7 |
| Comparative Preparation Example 4 | 0.871 | 7800 | 1099 | 32.64 | 31.64 | 20,000 | 1.98 | 49.3/65.1 |
| Comparative Preparation Example 5 | 0.875 | 15800 | 550 | 26.31 | 33.11 | 23,000 | 2.24 | 51.8/67.8 |
| Comparative Preparation Example 6 | 0.876 | 13900 | 676 | 26.89 | 28.76 | 22,800 | 1.94 | 56.1/73.2 |
| Comparative Preparation Example 7 | 0.879 | 3500 | 1265 | 33.65 | 30.12 | 14,600 | 1.97 | 61.3/77.8 |
| Comparative Preparation Example 8 | 0.872 | >50000 | — | — | — | 46,800 | 2.14 | 40.6/58.7 |
| Comparative Preparation Example 9 | 0.874 | >50000 | — | — | — | 75,400 | 2.08 | 42.1/59.6 |
| Comparative Preparation Example 10 | 0.874 | >50000 | — | — | — | 57,700 | 2.09 | 41.7/59.4 |
| Comparative Preparation Example 11 | 0.873 | >50000 | — | — | — | 48,700 | 2.08 | 41.3/58.7 |
| Comparative Preparation Example 12 | 0.875 | 15800 | 550 | 26.51 | 33.87 | 26,700 | 2.24 | 51.9/67.8 |

In case of Comparative Preparation Examples 8 to 11, which showed too high viscosity, the crystallinity index was not measured.

TABLE 3

|  | Monomer reactivity ratio | | |
|---|---|---|---|
|  | Re | Rc | ReXRc |
| Preparation Example 4 | 8.53 | 0.11 | 0.94 |
| Preparation Example 6 | 9.30 | 0.10 | 0.93 |
| Preparation Example 7 | 7.31 | 0.13 | 0.95 |
| Preparation Example 8 | 6.71 | 0.14 | 0.94 |
| Preparation Example 9 | 8.09 | 0.11 | 0.89 |
| Preparation Example 10 | 8.82 | 0.11 | 0.97 |
| Preparation Example 11 | 7.83 | 0.12 | 0.94 |
| Comparative Preparation Example 6 | 1.29 | 1.56 | 1.50 |
| Comparative Preparation Example 12 | 8.11 | 0.25 | 2.03 |

[Preparation of Adhesive Composition]

Example 1

An adhesive composition including 39.5 wt % of the copolymer of Preparation Example 5 as an ethylene/alpha-olefin copolymer, 40 wt % of SUKOREZ® SU-110S (Kolon Industries, Inc.) as a tackifier, 20 wt % of SASOLWAX H1 (SASOL) as a plasticizer and 0.5 wt % of Irganox1010 (BASF) as an antioxidant, was prepared.

Examples 2 to 8 and Comparative Examples 1 to 8

Adhesive compositions were prepared according to the same method as in Example 1 except for changing the kinds and amounts of the ethylene/alpha-olefin copolymer, tackifier, plasticizer, and antioxidant as listed in Table 4 below.

TABLE 4

| | ethylene/alpha olefin copolymer | | | | | | | | Tackifier | | Plasticizer | Antioxidant |
|---|---|---|---|---|---|---|---|---|---|---|---|---|
| | Preparation Example | | | | Comparative Preparation Example | | | | SU-100S | H-100W* | SasolH1 | IR1010 |
| | 4 | 5 | 6 | 8 | 5 | 6 | 7 | 12 | | | | |
| Example 1 | | 39.5 | | | | | | | 40 | | 20 | 0.5 |
| Example 2 | 39.5 | | | | | | | | 40 | | 20 | 0.5 |
| Example 3 | | 39.5 | | | | | | | | 40 | 20 | 0.5 |
| Example 4 | 39.5 | | | | | | | | | 40 | 20 | 0.5 |
| Example 5 | | | 39.5 | | | | | | 40 | | 20 | 0.5 |
| Example 6 | | | | 39.5 | | | | | 40 | | 20 | 0.5 |
| Example 7 | | | 39.5 | | | | | | | 40 | 20 | 0.5 |
| Example 8 | | | | 39.5 | | | | | | 40 | 20 | 0.5 |
| Comparative Example 1 | | | | | 39.5 | | | | 40 | | 20 | 0.5 |
| Comparative Example 2 | | | | | | 39.5 | | | 40 | | 20 | 0.5 |
| Comparative Example 3 | | | | | 39.5 | | | | | 40 | 20 | 0.5 |
| Comparative Example 4 | | | | | | 39.5 | | | | 40 | 20 | 0.5 |
| Comparative Example 5 | | | | | | | 39.5 | | 40 | | 20 | 0.5 |
| Comparative Example 6 | | | | | | | 39.5 | | | 40 | 20 | 0.5 |
| Comparative Example 7 | | | | | | | | 39.5 | 40 | | 20 | 0.5 |
| Comparative Example 8 | | | | | | | | 39.5 | | 40 | 20 | 0.5 |

*Eastotac H-100W (Eastman Chemical Company)

Experimental Examples

Physical properties on the adhesive compositions of the Examples and the Comparative Examples were measured by the methods below, and are shown in Table 5.

1) Heat resistance (° C.): In order to evaluate heat resistance, a peel adhesion failure temperature (PAFT) specimen was prepared according to the method below.

The adhesive composition thus prepared was dissolved in a HMA coater and coated on a PET film which was release treated with silicon to a thickness of 75 μm, and this film was cut into a thickness of 75 μm, a width of 25 mm, and a length of 250 mm. A kraft paper of 160 g/m² was weighed, and cut into two sheets having a width of 125 mm×a length of 210 mm. Between the kraft papers, the HMA with a film shape was put in lengthwise and cut in a width direction with an interval of 2.5 mm into 8 samples. The temperature of the top plate of a hot plate was set to 180° C., a specimen was put thereon and compressed with a pendulum of 1 kg on the center of the specimen for 5 seconds. The specimen thus manufactured was stood at room temperature for at least 6-24 hours to completely set HMA.

With respect to the PAFT specimen, a pendulum of 100 g was suspended, the temperature was elevated in a rate of 5° C./min, and the temperature at a point of the droppage of the pendulum was measured.

2) Adhesiveness at a low temperature (%): A specimen for evaluating the adhesiveness at a low temperature was prepared by the same method as the manufacturing method of the PAFT specimen except for coating to a thickness of 100 μm on the PET film.

Seven or more specimens were prepared per temperature, stood at −40° C., −30° C. for 6 to 24 hours, and the degree of fiber tear of HMA was confirmed with the naked eye on the basis of the scale of a section paper in a low temperature chamber, and the retention ratio of the kraft paper was recorded.

3) Heat resistant discoloration (YI): measured using a forced convention oven by JEIO TECH (OF-22) according to the method below. In detail, 100 g of an adhesive composition which was prepared after cut within 2.5 mm×2.5 mm, was weighed. The specimen thus weighed was put in a 250 ml, heat resistant beaker and heated at 140° C. in a vacuum oven three or four times for 10 to 20 minutes to remove remaining bubbles. The mouth of the beaker was sealed with an aluminum foil, the temperature of a convention oven was set to 180° C., and the beaker was continuously heated for 72 hours. Then, a specimen was formed into a thickness of 2 mm and a YI value was measured. YI used was an average value after measuring three or more different points of the specimen.

TABLE 5

| | Heat resistance (° C.) | Adhesiveness at a low temperature (%) | | Heat resistant discoloration (YI) |
|---|---|---|---|---|
| | | −40° C. | −30° C. | |
| Example 1 | 57 | 92 | 88 | 61 |
| Example 2 | 58 | 88 | 90 | 60 |
| Example 3 | 58 | 77 | 80 | 59 |
| Example 4 | 60 | 75 | 78 | 60 |
| Example 5 | 58 | 92 | 88 | 61 |
| Example 6 | 59 | 88 | 90 | 60 |
| Example 7 | 59 | 77 | 80 | 60 |
| Example 8 | 58 | 75 | 78 | 59 |
| Comparative Example 1 | 54 | 82 | 76 | 64 |
| Comparative Example 2 | 56 | 76 | 78 | 65 |
| Comparative Example 3 | 55 | 68 | 74 | 63 |
| Comparative Example 4 | 56 | 63 | 70 | 63 |
| Comparative Example 5 | 44 | 53 | 58 | 70 |

TABLE 5-continued

| | Heat resistance (° C.) | Adhesiveness at a low temperature (%) | | Heat resistant discoloration (YI) |
|---|---|---|---|---|
| | | −40° C. | −30° C. | |
| Comparative Example 6 | 45 | 54 | 59 | 69 |
| Comparative Example 7 | 56 | 82 | 76 | 64 |
| Comparative Example 8 | 56 | 68 | 75 | 63 |

Referring to Table 5, in case of the adhesive compositions according to the present invention, excellent heat resistance and adhesiveness at a low temperature were confirmed. The experiment on heat resistance is measurement of a critical temperature at which the adhesiveness is maintained in specific conditions, and is an indirect index of adhesiveness. If this value is high, the adhesiveness may be maintained at a high temperature, and the adhesive composition may be used in high temperature environment. In addition, the experiment on the adhesiveness at a low temperature is for measuring adhesiveness durability at a low temperature, and is an important adhesiveness index considering the properties of a polyolefin-based hot melt adhesive composition, which is used as a packing material of beverage or food.

Particularly, when compared with the Comparative Example using the same tackifier, the adhesive composition of the present invention showed exfoliation phenomenon at a higher temperature, and thus had even better heat resistance.

In addition, in the experiment on fiber tear performed at low temperatures of −40° C. and −30° C., respectively, the retention ratio (%) of the kraft paper was maintained to an even better degree when compared with the Comparative Examples, and thus, the adhesive composition of the present invention was confirmed to maintain excellent adhesiveness at a ultra low temperature.

As described above, the adhesive composition of the present invention includes an ethylene/alpha-olefin copolymer having a crystallization index of 15 to 25 and largely improved crystallinity, and shows excellent heat resistance and adhesiveness at a low temperature.

The invention claimed is:

1. An adhesive composition comprising an ethylene/alpha-olefin copolymer; and a tackifier,
   wherein the ethylene/alpha-olefin copolymer satisfies the following conditions i) to iv):
   i) density: 0.85 to 0.89 g/cc, measured according to ASTM D-792,
   ii) molecular weight distribution (MWD): 1.5 to 3.0,
   iii) viscosity: 6,000 cP to 40,000 cP, when measured at a temperature of 180° C., and
   iv) crystallization index (CI) according to the following Equation 1: 15 to 25:

$$CI = A^3/B \quad \text{[Equation 1]}$$

in Equation 1,
   A is full width at half maximum (FWHM) of a peak shown during measuring crystallization temperature, and
   B is a numerical value measured as melt index (MI) according to ASTM D-1238 (condition E, 190° C., 2.16 kg load), wherein the numerical value has a unit of "dg/min".

2. The adhesive composition according to claim 1, wherein the ethylene/alpha-olefin copolymer has a crystallization index of 16 to 23.

3. The adhesive composition according to claim 1, wherein the ethylene/alpha-olefin copolymer further satisfies the following condition v):
   v) ReXRc≤1.0
   where Re=kee/kec, Rc=kcc/kce,
   kee represents a propagation reaction rate constant when ethylene is added to a propagation chain of which terminal active site is an ethylene monomer, kec represents a propagation reaction rate when an alpha olefin comonomer is added to a propagation chain of which terminal active site is an ethylene monomer, kcc represents a propagation reaction rate when an alpha olefin comonomer is added to a propagation chain of which terminal active site is an alpha olefin comonomer, and kce represents a propagation reaction rate constant when an ethylene monomer is added to a propagation chain of which terminal active site is an alpha olefin comonomer.

4. The adhesive composition according to claim 1, wherein the ethylene/alpha-olefin copolymer has the ReXRc value of 0.95 or less.

5. The adhesive composition according to claim 1, wherein the ethylene/alpha-olefin copolymer has a weight average molecular weight of 17,000 to 40,000 g/mol.

6. The adhesive composition according to claim 1, wherein the ethylene/alpha-olefin copolymer has the viscosity of 8,500 to 35,000 cP, when measured at a temperature of 180° C.

7. The adhesive composition according to claim 1, wherein the ethylene/alpha-olefin copolymer has the density of 0.860 to 0.885 g/cc, measured according to ASTM D-792.

8. The adhesive composition according to claim 1, wherein the alpha-olefin comprises one or more selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and 1-eicocene.

9. The adhesive composition according to claim 1, wherein the alpha-olefin is comprised in an amount of from greater than 0 to 99 mol % or less, with respect to a total weight of the copolymer.

10. The adhesive composition according to claim 1, further satisfying the following conditions vi) to viii):
    vi) total number of unsaturated functional groups per 1000 carbon atoms: 0.8 or less,
    vii) a number average molecular weight (Mn): 9,000 to 25,000, and
    viii) melt index (MI) at 190° C., 2.16 kg load by ASTM D1238: 200 to 1,300 dg/min.

11. The adhesive composition according to claim 1, wherein the tackifier is one or more selected from the group consisting of a modified C5 hydrocarbon resin, a styrenated 4eflon resin, a totally or partially hydrogenated C9 hydrocarbon resin, a hydrogenated alicyclic hydrocarbon resin, a hydrogenated aromatic modified alicyclic hydrocarbon resin and a mixture thereof.

12. An article comprising a substrate coated with the adhesive composition according to claim 1.

13. The adhesive composition according to claim 1, wherein the ethylene/alpha-olefin copolymer has a crystallization temperature (Tc) of 45° C. to 60° C., and a melting temperature I of 60 to 80° C., wherein both the crystallization temperature and the melting temperature are measured using a differential scanning calorimeter (DSC).

14. The adhesive composition according to claim 1, wherein the tackifier is included in 5 parts by weight to 70 parts by weight with respect to 100 parts by weight of the adhesive composition, and the ethylene/alpha-olefin copolymer is included in 10 parts by weight to 50 parts by weight with respect to 100 parts by weight of the adhesive composition.

15. A method of preparing an ethylene/alpha-olefin copolymer, which satisfies the following conditions i) to iv):
   i) density: 0.85 to 0.89 g/cc, measured according to ASTM D-792,
   ii) molecular weight distribution (MWD): 1.5 to 3.0,
   iii) viscosity: 6,000 cP to 40,000 cP, when measured at a temperature of 180° C., and
   iv) crystallization index (CI) according to the following Equation 1: 15 to 25:

$$CI = A^3/B$$ [Equation 1]

in Equation 1,
   A is full width at half maximum (FWHM) of a peak shown during measuring crystallization temperature, and
   B is a numerical value measured as melt index (MI) according to ASTM D-1238 (condition E, 190° C., 2.16 kg load), wherein the numerical value has a unit of "dg/min",
   the method comprising a step of polymerizing ethylene and an alpha-olefin-based monomer by injecting hydrogen in 45 to 100 cc/min in the presence of a catalyst composition including a transition metal compound of Formula 1:

to 20 carbon atoms; or phenyl which is substituted with one or more selected from the group consisting of halogen, alkyl of 1 to 20 carbon atoms, cycloalkyl of 3 to 20 carbon atoms, alkenyl of 2 to 20 carbon atoms, alkoxy of 1 to 20 carbon atoms and aryl of 6 to 20 carbon atoms, $R_4$ to $R_9$ are each independently hydrogen; silyl; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; or hydrocarbyl of 1 to 20 carbon atoms; where among the $R_6$ to $R_9$, adjacent two or more are optionally connected with each other to form a ring, Q is Si or C, M is a transition metal in group 4, and $X_1$ and $X_2$ are each independently hydrogen; halogen; alkyl of 1 to 20 carbon atoms; cycloalkyl of 3 to 20 carbon atoms; alkenyl of 2 to 20 carbon atoms; aryl of 6 to 20 carbon atoms;

alkylaryl of 7 to 20 carbon atoms; arylalkyl of 7 to 20 carbon atoms; alkylamino of 1 to 20 carbon atoms; or arylamino of 6 to 20 carbon atoms.

16. The method of preparing the ethylene/alpha-olefin copolymer according to claim 15, wherein the compound of Formula 1 comprises a compound represented by any one among the structures below:

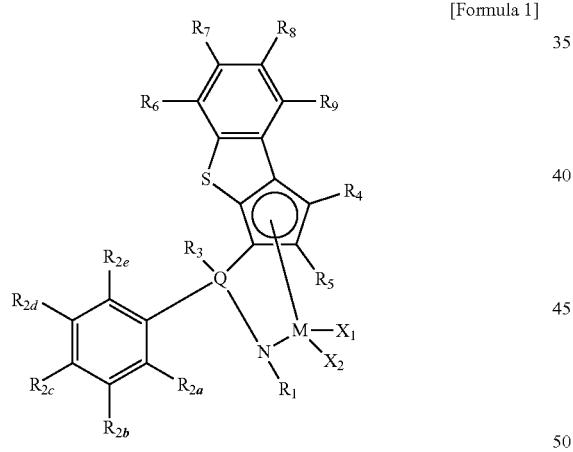

[Formula 1]

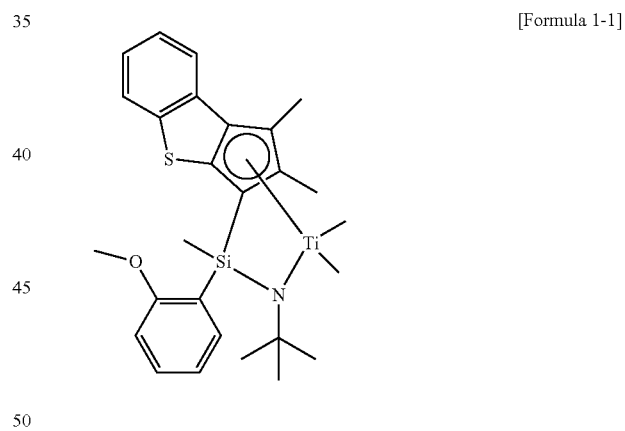

[Formula 1-1]

wherein,
$R_1$ is hydrogen; alkyl of 1 to 20 carbon atoms; cycloalkyl of 3 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_{2a}$ to $R_{2e}$ are each independently hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; or aryl of 6 to 20 carbon atoms, $R_3$ is hydrogen; halogen; alkyl of 1 to 20 carbon atoms; cycloalkyl of 3 to 20 carbon atoms; alkenyl of 2 to 20 carbon atoms; aryl of 6 to 20 carbon atoms; alkylaryl of 6 to 20 carbon atoms; arylalkyl of 7 to 20 carbon atoms; alkyl amido of 1 to 20 carbon atoms; aryl amido of 6

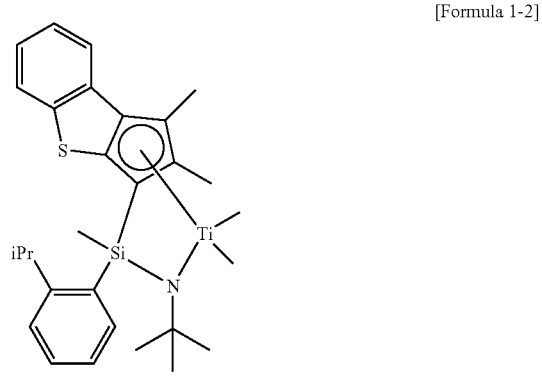

[Formula 1-2]

[Formula 1-3]
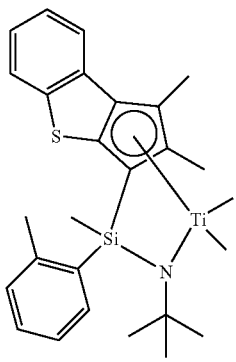
[Formula 1-4]
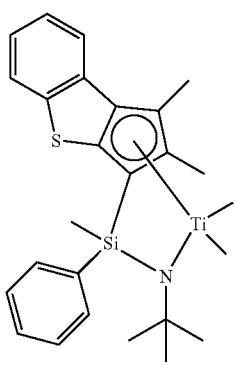
[Formula 1-5]
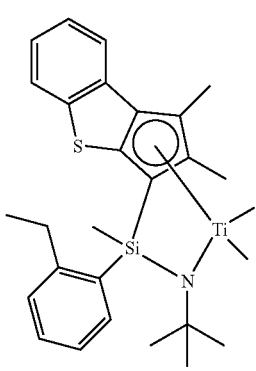
[Formula 1-6]
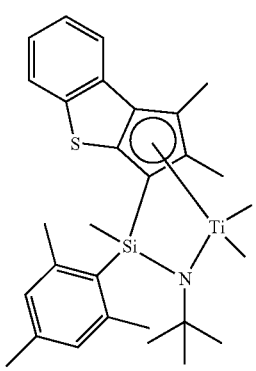
[Formula 1-7]
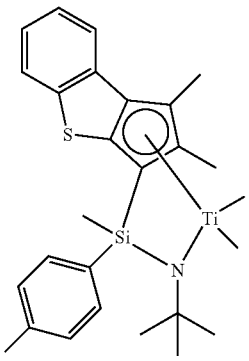
[Formula 1-8]
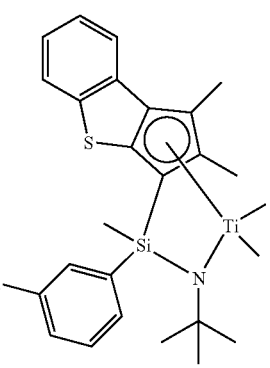
[Formula 1-9]
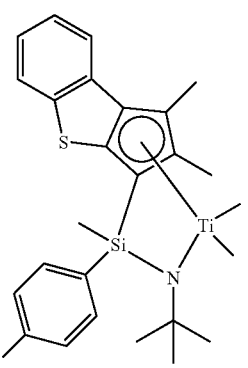
[Formula 1-10]
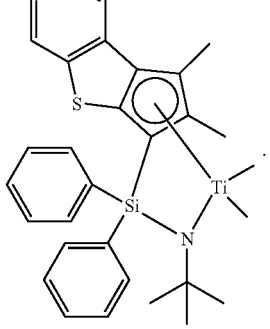
17. The method of preparing the ethylene/alpha-olefin copolymer according to claim 15, wherein the catalyst composition further comprises a promoter for activating the transition metal compound of Formula 1.

18. The method of preparing the ethylene/alpha-olefin copolymer according to claim 17, wherein the promotor comprises an organometal compound including a metal in group 13.

19. The method of preparing the ethylene/alpha-olefin copolymer according to claim 17, wherein the promotor comprises one or more selected from a compound of the following Formula 2, a compound of the following Formula 3, or a compound of the following Formula 4:

$$R_{41}\text{-}[Al(R_{42})\text{---}O]_n\text{-}R_{43} \qquad \text{[Formula 2]}$$

in Formula 2, $R_{41}$, $R_{42}$ and $R_{43}$ are each independently any one selected from hydrogen, halogen, a hydrocarbyl group of 1 to 20 carbon atoms, or a halogen-substituted hydrocarbyl group of 1 to 20 carbon atoms, and n is an integer of 2 or more, $$D(R_{44})_3 \qquad \text{[Formula 3]}$$

in Formula 3, D is aluminum or boron, and each $R_{44}$ is each independently any one selected from halogen, a hydrocarbyl group of 1 to 20 carbon atoms, or a halogen-substituted hydrocarbyl group of 1 to 20 carbon atoms, $$[L\text{-}H]^+[Z(A)_4]^- \text{ or } [L]^+[Z(A)_4]^- \qquad \text{[Formula 4]}$$

in Formula 4, H is a hydrogen atom, and Z is an element in group 13, A is each independently a hydrocarbyl group of 1 to 20 carbon atoms; or a hydrocarbyloxy group of 1 to 20 carbon atoms, wherein the hydrocarbyl group or hydrocarbyloxy group is unsubstituted or substituted with one or more substituents selected from halogen, a hydrocarbyloxy group of 1 to 20 carbon atoms, or a hydrocarbylsilyl group of 1 to 20 carbon atoms, and L is a neutral Lewis base and $[L\text{-}H]^+$ is a conjugated acid cation in $[L\text{-}H]^+[Z(A)_4]^-$, and $[L]^+$ is a Lewis acid in $[L]^+[Z(A)_4]^-$.

20. The method of preparing the ethylene/alpha-olefin copolymer according to claim 15, wherein the transitional metal compound of Formula 1 is in a supported state on a support, and a weight ratio of the transitional metal compound of Formula 1 to the support is 1:10 to 1:1,000.

* * * * *